United States Patent
Slyne

(10) Patent No.: US 6,645,406 B1
(45) Date of Patent: Nov. 11, 2003

(54) DIFFERENTIAL VELOCITY EXTRUSION

(75) Inventor: William J. Slyne, Toronto (CA)

(73) Assignee: Industrial Evolution, Inc., Ontario (CA)

(*) Notice: Subject to any disclaimer, the term of this patent is extended or adjusted under 35 U.S.C. 154(b) by 443 days.

(21) Appl. No.: 09/609,867

(22) Filed: Jul. 3, 2000

(51) Int. Cl.$^7$ .............................................. B29C 47/92
(52) U.S. Cl. ................. 264/40.7; 264/167; 264/177.16; 264/178 R; 425/145
(58) Field of Search ................ 264/40.7, 167, 264/177.1, 177.16, 178 R; 425/71, 145, 378.1, 465

(56) References Cited

U.S. PATENT DOCUMENTS

| | | |
|---|---|---|
| 3,920,365 A | 11/1975 | Mules |
| 3,940,221 A | 2/1976 | Nissel |
| 4,221,753 A | 9/1980 | Bradbury |
| 4,237,082 A | 12/1980 | LaSpisa et al. |
| 4,423,191 A | 12/1983 | Haven et al. |
| 4,439,125 A | 3/1984 | Dieckmann et al. |
| 4,711,747 A | 12/1987 | Halter |
| 4,744,745 A | 5/1988 | Harada et al. |
| 4,851,173 A | 7/1989 | Mackley et al. |
| 4,906,171 A | 3/1990 | Miller |
| 4,966,807 A | 10/1990 | Harvey et al. |
| 5,061,553 A | 10/1991 | Olsen, Jr. |
| 5,258,148 A * | 11/1993 | Sensen et al. ............... 264/409 |
| 5,259,747 A | 11/1993 | Cloeren |
| 5,333,568 A | 8/1994 | Meldner et al. |
| 5,573,716 A | 11/1996 | Jacobson |
| 5,770,129 A | 6/1998 | Monti |
| 5,888,613 A | 3/1999 | Ketcham et al. |

FOREIGN PATENT DOCUMENTS

EP 0056657 1/1982

OTHER PUBLICATIONS

Polymers The Origins and Growth of Science pps. 180–181, by Herbert Morawetz.
Gross H: "Neues Werkzeugkonzept Fur Die Coextrusion" Plastverarbeiter, Zechner Und HuethigVerlag GMBH vol. 46, No. 3, Mar. 1995, pp. 86, 89–90, 92 and 94.

* cited by examiner

*Primary Examiner*—Mark Eashoo
(74) *Attorney, Agent, or Firm*—John H. Thomas P.C.

(57) ABSTRACT

A method of an extruded membrane of solidified flowable material having a desired curvature comprising extruding flowable material through a die in a curved section; measuring a characteristic of said extruded material at a plurality of positions along said die slot; comparing said plurality of measurements against a desired plurality of measurements respectively at each said position along said die slot and generating a plurality of signals respectively in response thereto; effecting a change in said measured characteristics of said extruded material at said positions along said die slot in response to said signals so as to produce said extruded material having a desired curvature.

11 Claims, 12 Drawing Sheets

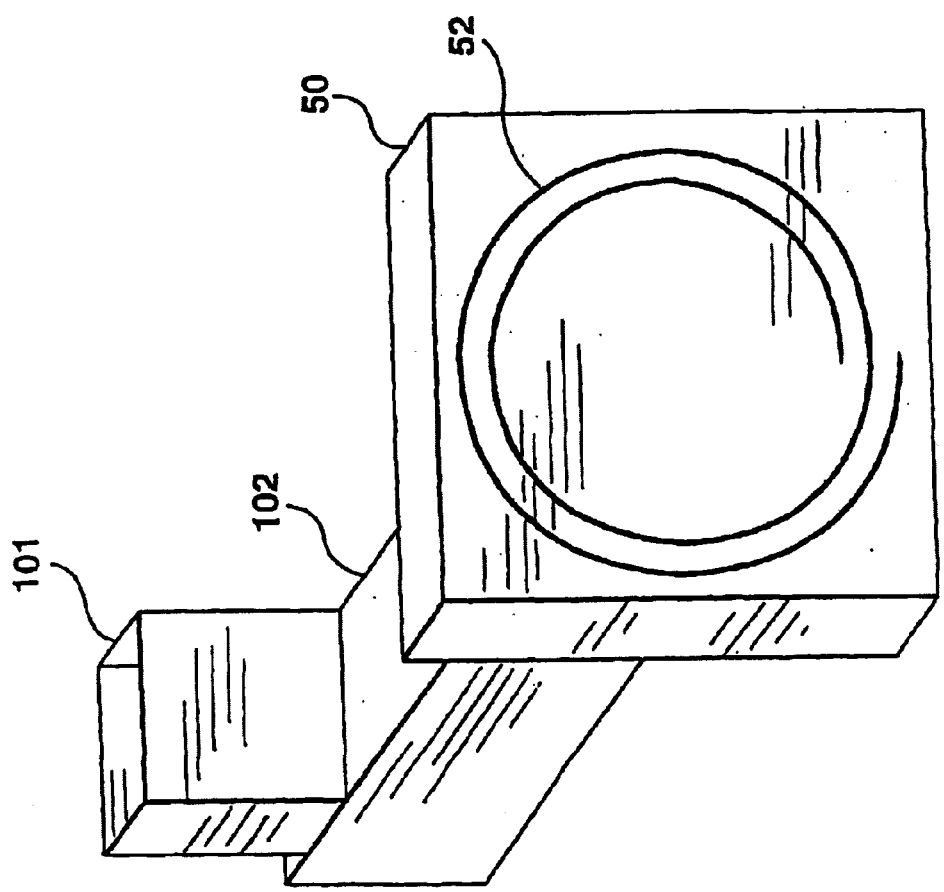

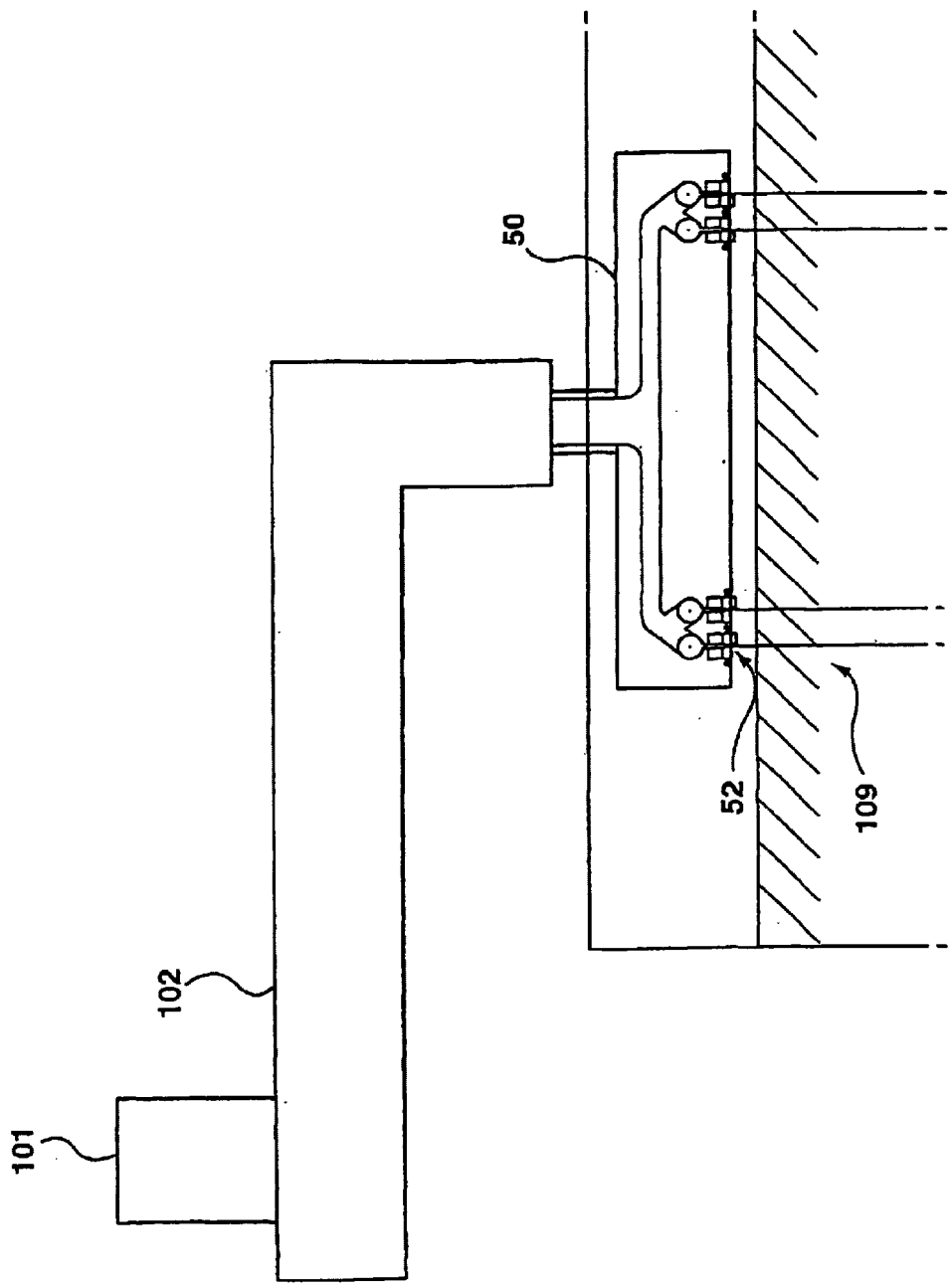

DIFFERENTIAL VELOCITY EXTRUSION

FIELD OF THE INVENTION

This invention relates to methods and apparatus for producing extruded membranes, and in particular relates to methods and apparatus to produce extruded polymeric membranes, and inparting a curvature during the extrusion process. Moreover this invention relates to extrusion dies having a curved die slot for imparting a curvature to the extruded membrane. Finally this invention relates to articles or products produced by the apparatus and methods, such products incorporating seamless curvate structure or structures.

BACKGROUND OF THE INVENTION

There are various methods and apparatus for producing extruded polymeric membranes. Such membranes are generally thin and have negligible bending stiffness but have substantial longitudinal, traverse and shear modulus. The negligible stiffness allows for relatively easy and repeatable isometric mappings.

Such prior art devices generally illustrate the production of articles having a planar structure. It is desirable, however, to produce articles having curvate structure. Moreover it is desirable to extrude polymetric membrane so as to impart complex curvature during the extrusion process where the complex curvature can be imparted in three dimensions such as along X, Y, Z axis.

Generally speaking the X-axis or dimension is the "Machine Direction" which is the direction of undisturbed material flow away from the die exit of an extrusion die. Furthermore the Y-axis generally relates to the "Transverse Direction" which is the local reference direction orientated normal to X and along the width of the slot die. The Z-axis or direction is known as the "Normal Direction" and is the local reference direction normal or at 90° to both X and Y orientated across the die gap.

The X, Y, Z axis or directions comprise a local or orthonormal coordinate frame. The frame is orientated locally with the extrusion die slot and typical dimensions by way of example are in the vicinity of:

X=infinite
Y=up to 25 feet or more
Z=0.001 to 0.050 inches such dimensions are given by way of example only and the invention described herein is not limited thereto.

The following terms have the following definitions herein:

Curvature. A quantitative measure along a space curve of the change in direction of the tangent vector differentiated along the curve length.

Plane curve. A curve that can be described in 2 dimensions, the vector product of any 2 distinct curvature vectors on the curve would always be normal to the plane of the curve.

Normal Curvature. A measure of curvature on a surface of a space curve measured normal to the surface and along the spacer curve at any point where the curve and the surface are tangent.

Gaussian Curvature. A precise quantitative measure of the intrinsic curvature at a point on a surface. It is the product of the minimum and maximum normal curvatures at any point on a surface.

A flat piece of paper has a Gaussian curvature of 0. A sphere has a Gaussian curvature of the inverse of the radius squared.

Complex Curvature. A qualitative definition of a surface where at least some portion of its area cannot be made flat.

Isometric Mapping A bending operation performed on a flexible surface such that the length along any trajectory across the surface remains unchanged before and after the bending operation. As a corollary the surface does not experience any shear strain. As another corollary Gaussian curvature is preserved at all point on the surface.

Membrane. A thin flexible surface that has negligible bending resistance, but substantial longitudinal, transverse and shear moduli.

Isotropic elasticity. An elastic material where the modulus of elasticity is constant and uniform in all directions.

Anisotropic elasticity. An elastic material where the modulus of elasticity varies uniformly as the direction of analysis is changed.

Moreover membranes can generally be described as thin flexible surfaces that have negligible bending resistance but substantial longitudinal, transverse shear moduli.

Current methods for producing polymeric membranes having a curvature include first extruding, casting, calendaring, or laminating a flat membrane and then imparting shape by thermo forming continuous membranes or by "paneling and joining" a plurality of flat membrane pieces to produce a finished membrane with complex curvature.

The paneled method includes flat membrane pieces that are reinforced while the thermo forming method also allows for reinforcing the finish membrane after thermo forming.

Other methods and devices are shown in U.S. Pat. No. 4,906,171, which teaches a die head that can pivot with respect to the internal source of extrudate material. Such pivoting allows for the adjustment of the distance, and hence the resistance to flow, from the internal source to the different locations across the die exit profile. This causes the extrudate to have different velocities at different locations across the die exit and as a result causes the extrudate to curve. This method will allow the extrusion of a section with curvature that varies along its length. In the case of a thin film, this method could produce an extrudate with curvature about only the normal direction Z. However this method would not permit one to vary the shape of the film across the width of the film (Y), such as to make films with programmed complex curvature.

Moreover U.S. Pat. No. 4,237,082 teaches the control of an extrusion die exit rate, where the rate of extrusion of an elongated article from a dynamic extruder is measured, and a measurement signal representative thereof is established. The measurement signal is then compared with a set point signal representing the desired extrusion rate to produce a control signal which is responsive to the difference between the measurement signal and the set point signal, to control the rate and pressure of extrudate to the manifold of the die.

Moreover U.S. Pat. No. 3,920,365 illustrates apparatus for making polymeric films whereby flowable polymeric material is extruded in molten form through an extrusion die orifice in the form of a web of film and which apparatus includes means for selectably controlling either by heating or cooling temperature of the isolated parts of the die lips defining the die orifice to improve thickness uniformity of the film.

U.S. Pat. No. 4,851,173 relates to a process for the continuous preparation of an oriented film of a polymer material, to produce highly oriented films from ultra high molecular weight (UHMW) polyethylene, polyester or the like.

Moreover U.S. Pat. No. 4,966,807 describes a method of extruding films through a counter-rotating annular die, where the extrudate is a thermotropic liquid crystal polymer that is given biaxial liquid orientation by the shear included between the walls of the counter-rotating dies.

Furthermore U.S. Pat. No. 5,333,568 teaches material for the fabrication of sails, where fine filaments of various high performance fibers are pull-truded and laminated, between films to produce a thin lightweight film.

Also some polymer, notably polyethylene are cross linked when exposed to ionizing radiation as taught by the article "Polymer The Origins and Growth of a Science", by Herbert Morawetz, published by John Wiley & Sons 1985, pages 180 and 181 Dover (1995) edition.

Furthermore U.S. Pat. No. 4,221,753 teaches an extrusion process wherein coolant under pressure is directed under the outer surface of a thermo plastic material being forced through an extrusion orifice such that at least a portion of the coolant immediately vaporizes and the resultant heat evaporation required for such action is taken from the material immediately contacting same. The coolant is introduced into a intermediate zone down stream from an initial extrusion zone and the interface between such zones is insulated so as to restrict conductive heat transfer between such zones immediately adjacent thereto so as to prevent possible freeze ups of the material in the initial extrusion zone.

U.S. Pat. No. 5,770,129 illustrates apparatus and method for controlling mass flow in an extrusion die that provides cross-directional measurements of at least one property of an extrusion produced by the extrusion die, such measurements being made at a plurality of cross-directional locations that successively span the extrusion. The measurements are assembled to provide cross-directional profiles of the extrusion.

Moreover U.S. Pat. No. 4,423,191 teaches a method for curing a resinous composition comprising an admixture of thermo setting resin and dialectically loss particles. Furthermore shaped articles of manufacture made by curing resinous compositions are disclosed by the method of U.S. Pat. No. 4,423,191.

Furthermore EP 0056657 illustrates a sail for sailing craft and method of making the sail.

Moreover U.S. Pat. No. 5,061,553 describes an article of manufacture namely a sail comprised of a plurality of flat co-extruded polymeric sheets.

Furthermore U.S. Pat. No. 5,259,747 relates to apparatus for providing uniformity of web thickness by providing a plurality of gap-controlling thermo energy sources, and heat exchange communication with the thermal energy sources, and assembly for compensating for temperature variation proximate to the thermal energy source and across the apparatus width.

Moreover U.S. Pat. No. 4,744,745 relates to a variable contour rubber extruder for continuously extruding rubber having compositions for various uses through a mouthpiece with belts and more particularly to a rubber extruder capable of varying cross-section of a mouthpiece to obtain particular contours of extruded rubber.

Moreover U.S. Pat. No. 3,940,221 relates to a die having controllable lip openings, through which flowable material is forced to form a sheet, film or tube. Lip opening control means include an elongated member which expands or contracts thermally and adjusts the lip opening to control the thickness and heating means is provided for controlling this expansion and contraction.

It is an object of this invention to provide an improved method and apparatus for producing extruded membranes having a curve imparted in a transverse direction relative to the flow of extruded material.

It is a further object of this invention to provide an improved method and apparatus for producing films having complex curvatures.

Furthermore it is an object of this invention to produce continuous seamless extruded articles having complex curvatures.

It is an aspect of this invention to provide a method of producing an extruded membrane of solidified flowable material having a desired curvature comprising: extruding flowable material through a die slot having a curved section; measuring a characteristic of said extruded material at a plurality of positions along said die slot; comparing said plurality of measurements against a desired plurality of measurements respectively at each said position along said die slot and generating a plurality of signals respectively in response thereto; effecting a change in said measured characteristic of said extruded material at said positions along said die slot in response to said signals such to produce said extruded material having a desired curvature.

It is another aspect of this invention to provide a method of producing an extruded membrane of solidified flowable material having a desired curvature comprising: extruding flowable material through a die slot having a curved section; measuring the velocity of said extruded material at a plurality of positions along said die slots; comparing said plurality of velocity measurements against a desired plurality of target velocity measurements to produce an error signal; changing the velocity of the flowable material at each said plurality of positions in response to said error signal; such to produce an extruded membrane having a desired curvature.

It is yet another aspect of this invention to provide an extrusion die for extruding a flowable material to produce a membrane having a desired curvature comprising die slot means having a curved section; a plurality of measuring means disposed along said die slot means for measuring a selected characteristic of said extruded material; means for varying the characteristic of said extruded material in response to said plurality of measurements so as to produce said extruded membrane having a desired curvature.

Furthermore it is an aspect of this invention to provide a sail comprising a seamless extruded material having a desired three-dimensional curvature.

It is also an aspect of this invention to provide a pool liner comprising a seamless extruded material having a desired three-dimensional curvature.

BRIEF DESCRIPTION OF THE DRAWINGS

A detailed description of the preferred embodiments are provided herein below by way of example only and with reference to the following drawings, in which:

FIG. 1C is a perspective view of the scroll die of FIGS. 1A and 1B.

FIG. 4B is a further side view of FIG. 4A.

Figure 1A:
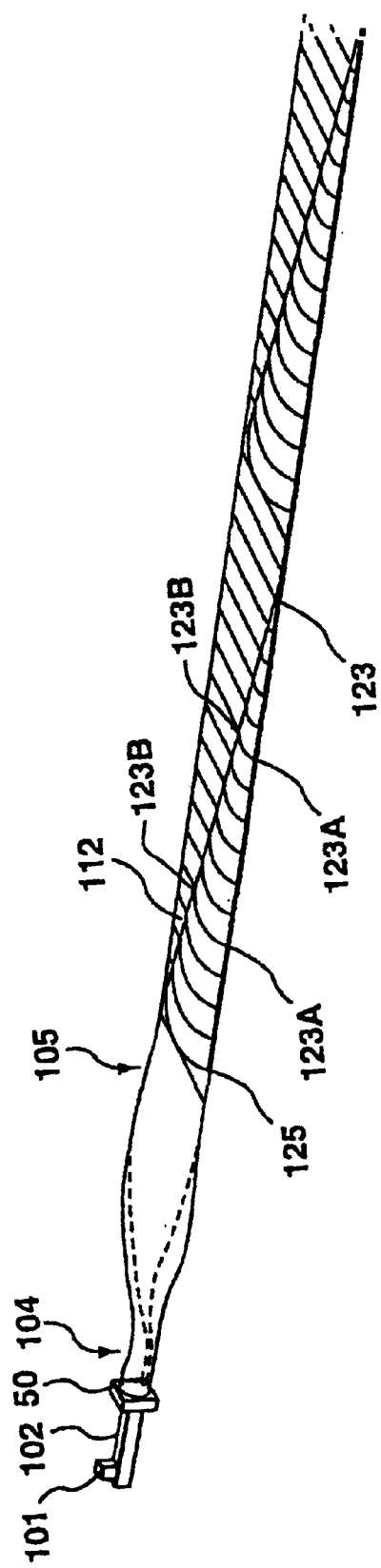
FIG. 1A is a perspective view of a scroll die extruding yacht sails.

In the drawings, preferred embodiments of the invention are illustrated by way of example. It is to be expressly understood that the description and drawings are only for the purpose of illustration and as an aid to understanding, and are not intended as a definition of the limits of the invention.

DESCRIPTION OF THE INVENTION

Figure 5A:
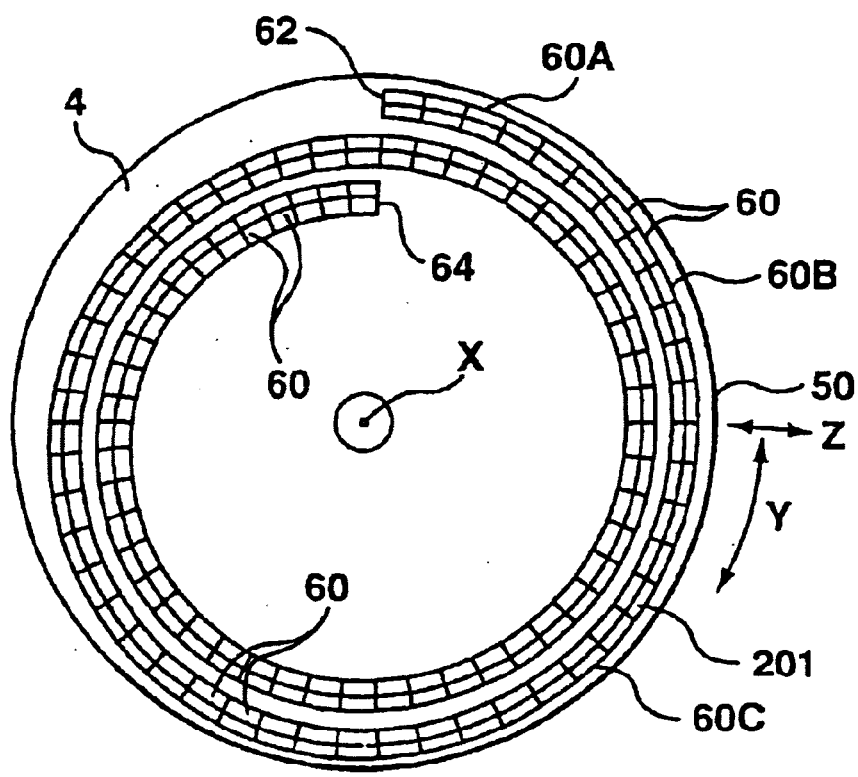
FIG. 5A is a top plan view of a scrolled die.
Figure 6A:
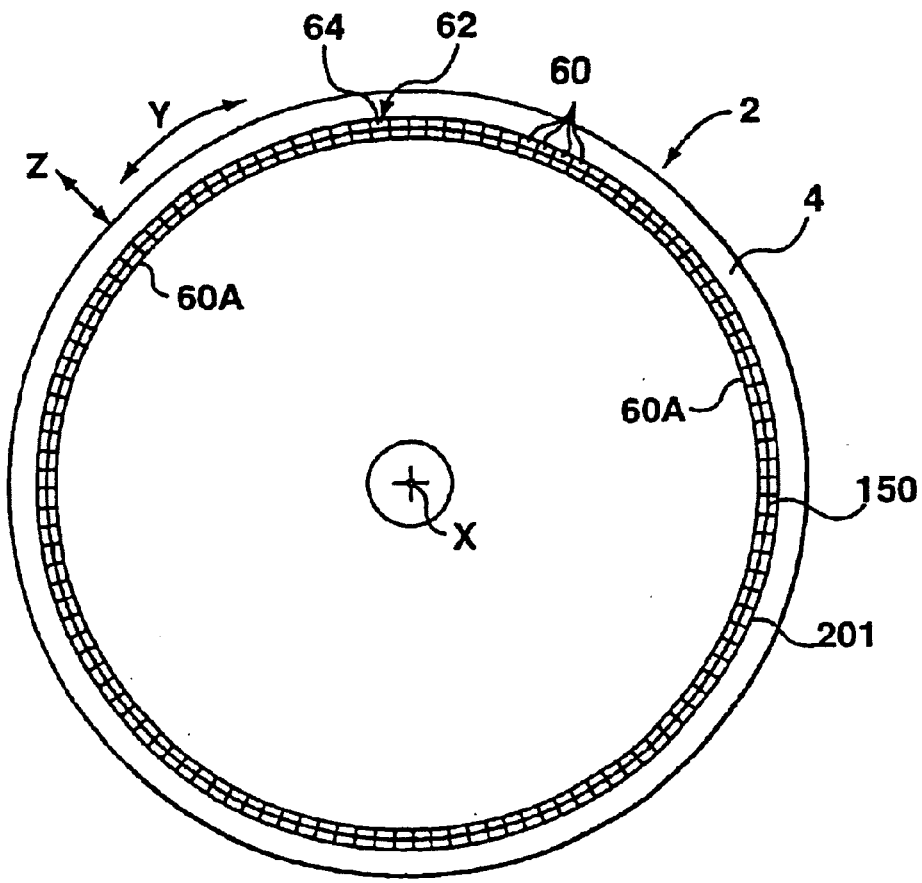
FIG. 6A is a top plan view of an annular die.

The apparatus and method described herein is utilized to produce flexible films and membranes with continuous intrinsic three-dimensional shape or geometry by utilizing a die 2. Such dies generally comprise of extrusion dies but it is possible to use pultrusion dies and methods where an annular die is used to pultrude a fiber reinforced, shaped extruded membrane as a closed tubular film where the pultrusion tension is balanced by gas pressures within the tube, out of which, for example, a sail is cut after winding. The die head 4 of the extrusion dies can either be of a scroll design 50 such as shown in FIG. 5A or an annular design which is shown in FIG. 6A. The die head 4 contains radial distribution manifolds 6 as shown for example in FIGS. 5A and 6A which feed circumferential distribution manifolds 8 with flowable material 10. The manifold arrangement is designed to uniformly distribute the particular material to be extruded.

Each of the scroll design 50 or annular design 150 die head 4 define a curved die slot 52 and 152 respectively.

In particular the curved die slot 52 and 152 are curved in the transverse direction namely the Y direction. The drawings illustrated a scrolled die 50 as well as an annular die 150. However the invention should not be limited to the design illustrated herein but rather the invention comprises a die slot which has at least a portion thereof which is curved. In other words the die slot may be straight for a portion and curved for another portion.

The extrusion dies 2 include a die ejection rate control element 213, which locally monitors or meters a parameter or characteristic of the flow of extrudate 10. By way of example the flowable material or extrudate 10 can be extruded to a water cooled or lubricated die slot 211. Water to the lubricated die slot is supplied from a pressurized manifold 212.

The apparatus includes means for measuring a characteristic or parameter of the extrudate 10, comprise for example of the die exit ejection rate control elements 213.

The die ejection rate control element 213 can monitor for example the ejection rate of the extrudate 10 at a plurality of locations or positions 60. In particular in a scrolled die 50 such as for example as shown in FIG. 5A, positions 60 comprise of all of the positions 60 which start at one end 62 and scroll around in a helical fashion to the other end 64. Each portion is defined by the extent of the die lips 111 and 113.

Figure 4A:
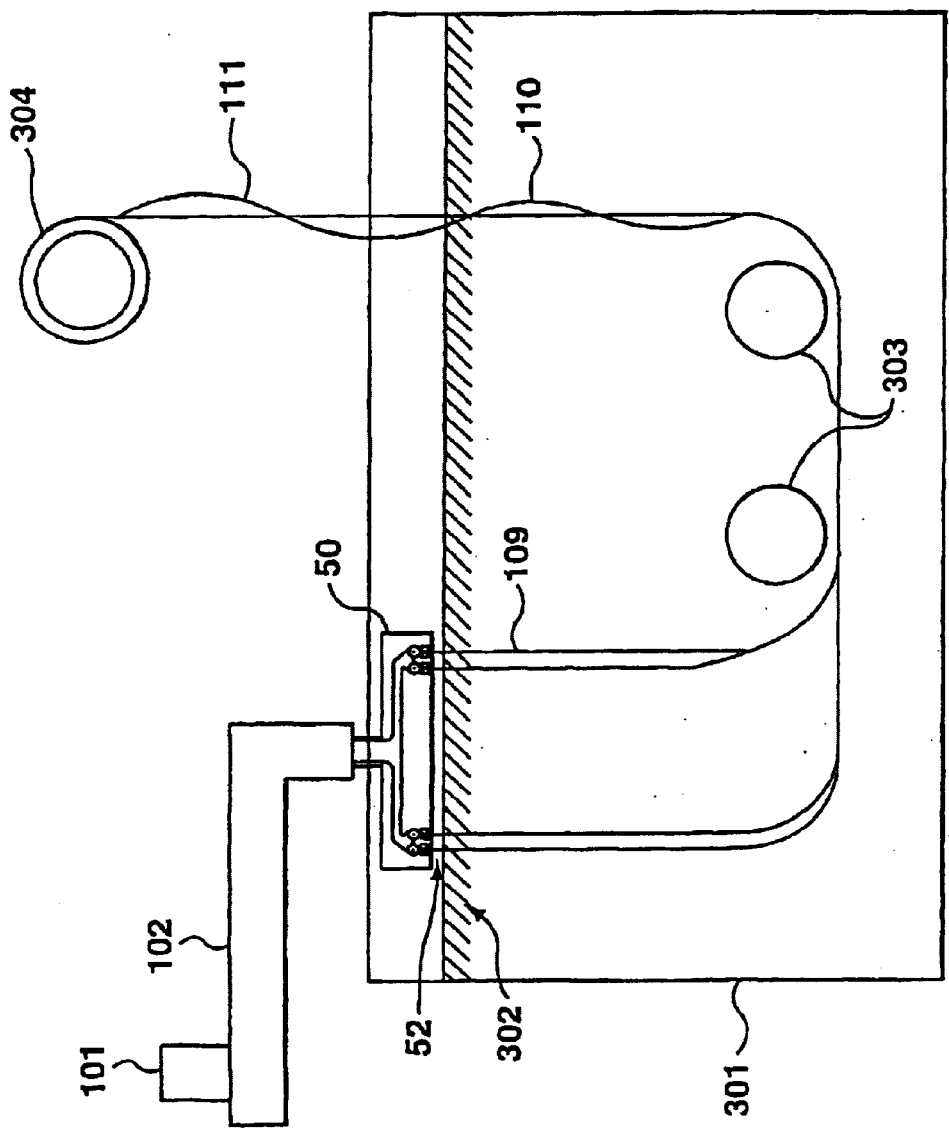
FIG. 4A is a schematic side view of a scroll die extruding pool liner floors where the extrudate is shown travelling downwards into a quenching tank.
Figure 6B:
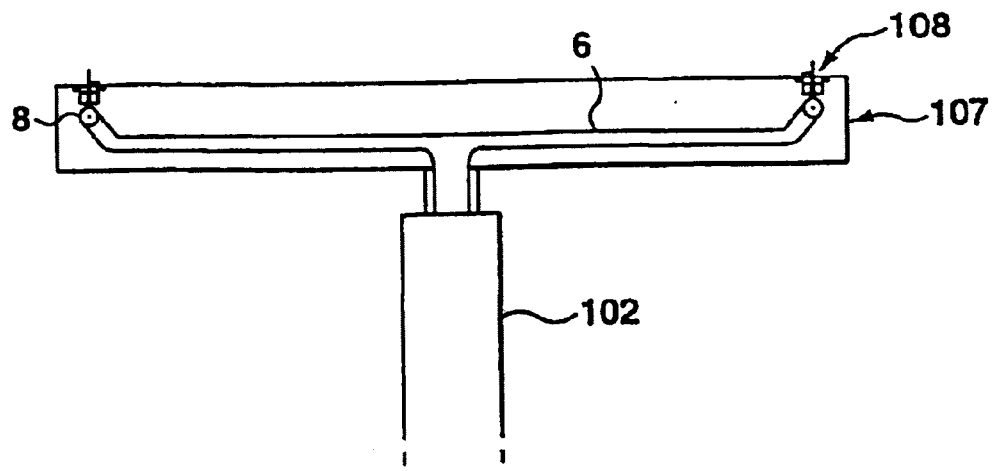
FIG. 6B is a side elevational view of FIG. 6A.
Figure 6C:
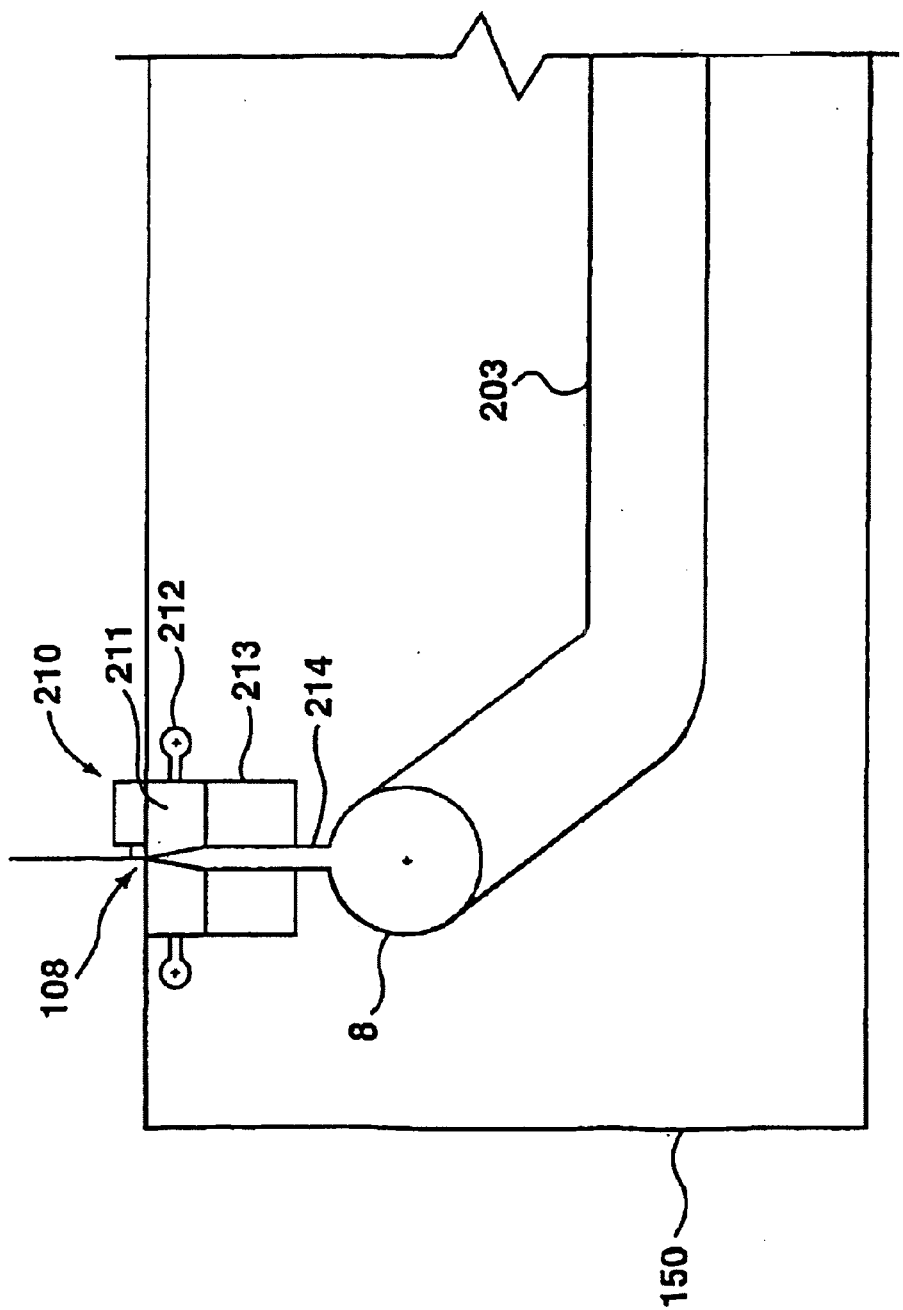
FIG. 6C is a close-up of a side view of FIG. 6B.

In the case of an annular die such as shown in FIG. 6-4 each of the locations or positions 60 comprise of the segments or locations that start at for example position 62 and wind their way around in a circular fashion to position 64 so as to define an annular die slot.

The ejection rate of the extrudate 10 is controlled or monitored so as to measure a characteristic of the extruded material 10 at the plurality of positions 60 along the die slots. For example the characteristic to be measured can comprise of the velocity of the extruded material 10 as it leaves the die slot at each of the positions 60. The ejection rate of the extruded material 10 can be controlled at the plurality of locations 60 such that the combination of the differential ejection velocity across the transverse direction of the membrane or film of the extrudate 10 combined with the curvature of the die exit will induce complex curvature into the membrane.

For example if we look at FIGS. 5A and 6A and look at direction X as being the direction of extrudate leaving the die surface, in the direction of the extruded film 10, the transverse direction Y defines a portion 60 of a die slot which is curved. The Z direction will generally in the direction of the thickness of the membrane of film 10.

The ejection rate control elements 213 will monitor or measure the characteristic or parameter of the extruded material 10 such as for example the ejection velocity. Accordingly the measuring means which comprise the ejection rate control elements 213 will measure the ejection velocity of the extruded film 10 at each segment or portion 60 across the die exit as described. For example the measurement means namely the ejection rate control elements 213 may take the form of optical surface measurement devices.

Other velocity control means could include one or more of the following:

1. A flow blockage such as an internal choker bar prior to the die lips 111 and 113, or a die lip gap control.
   In particular by reference to FIG. 5C the die lip would comprise of the space between elements 111 and 113 which can be controlled so as to increase the die gap, which would have the effect of increasing the velocity of the extrudate 10 between the die lip or reducing the space between the die lips 111 and 113 which would have the effect of reducing the velocity of the extrudate film 10.
2. rheological or viscosity control, wherein an increase in viscosity would reduce the velocity of the extrudate 10 at the die section or portion 60
   such rheological control may be accomplished by one or more of the following:
   (a) die lip temperature control where higher temperatures decrease the viscosity of the extrudate 10 and thereby increase its velocity. This effects primarily the extrudate at the die walls.
   (b) electromagnetic radiation may be used to heat the extrudate 10 to decrease the viscosity;
   (c) RF energy can be used to apply a deep heat through the entire die gap thickness;
   (d) ionizing radiation may be used to induce cross-linking in an extrudate date such as polyethylene film which has the effect of increasing the viscosity through the die gap thickness;
   (e) electromagnetic current or an electric or magnetic field may be applied in the vicinity of the die lips 111 and 113 so to adjust the viscosity of electro-rheological fluids and in some cases impart molecular orientation. This type of control is immediate and in effect only for the duration of the current application;
3. die wall friction control can be utilized in the vicinity of the die lips 111 and 113 such as:

(a) ultrasonic energy delivered to one or more of the die lips 111 and 113 so as to reduce the friction of the extrudate 10 within the die walls, and may provide for local contact heating.

(b) Lubrication and cooling can be supplied in the region of the die lips 111 and 113 just prior to the die exit by the injection of water or other suitable lubricant through the walls.

4. It is possible to use co-extruded membranes with control over one or more of the extruded layers or volume control on particular layers to effect net viscosity.

A control system such as a computer or the like can be utilized to receive signals from the velocity measurement stations 210 so as to compare this signal to the programmed velocities for the desired membrane shape to produce control outputs to the die exit ejection rate control elements 213.

For example if the velocity of the extrudate 10 at each of the segments 60 in FIG. 6A flows out at an equal velocity from the annular extrusion die of FIG. 6A the blown film from the extrusion die 150 would exit as a bubble having a generally cylindrical surface having a central axis X. Moreover if such blow cylindrical extrudate 10 would be slit along one side thereof the annular die 150 would produce a substantially flat membrane.

Figure 2:
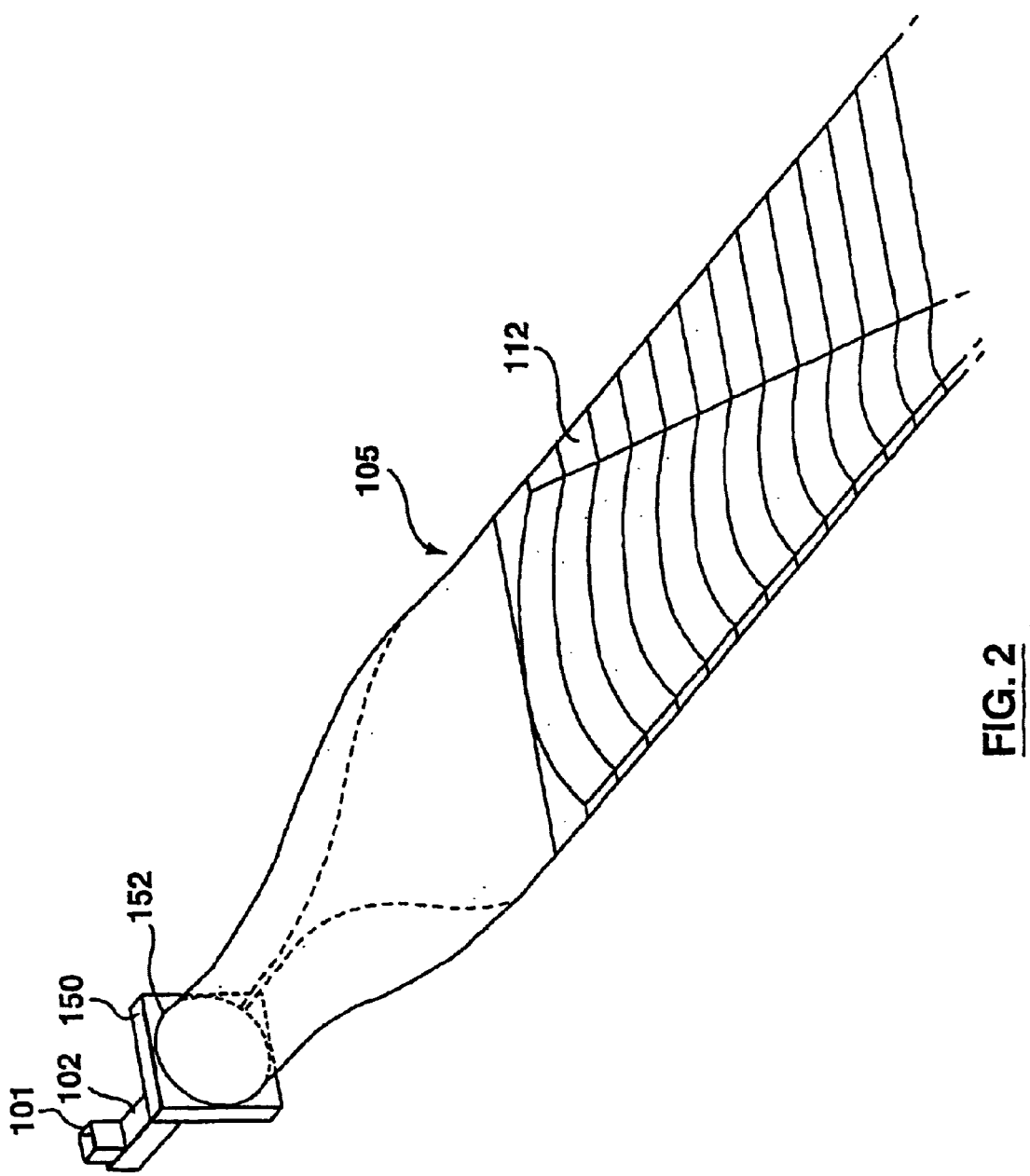
FIG. 2 is a perspective view of an annular die extruding yacht sails.
Figure 3A:
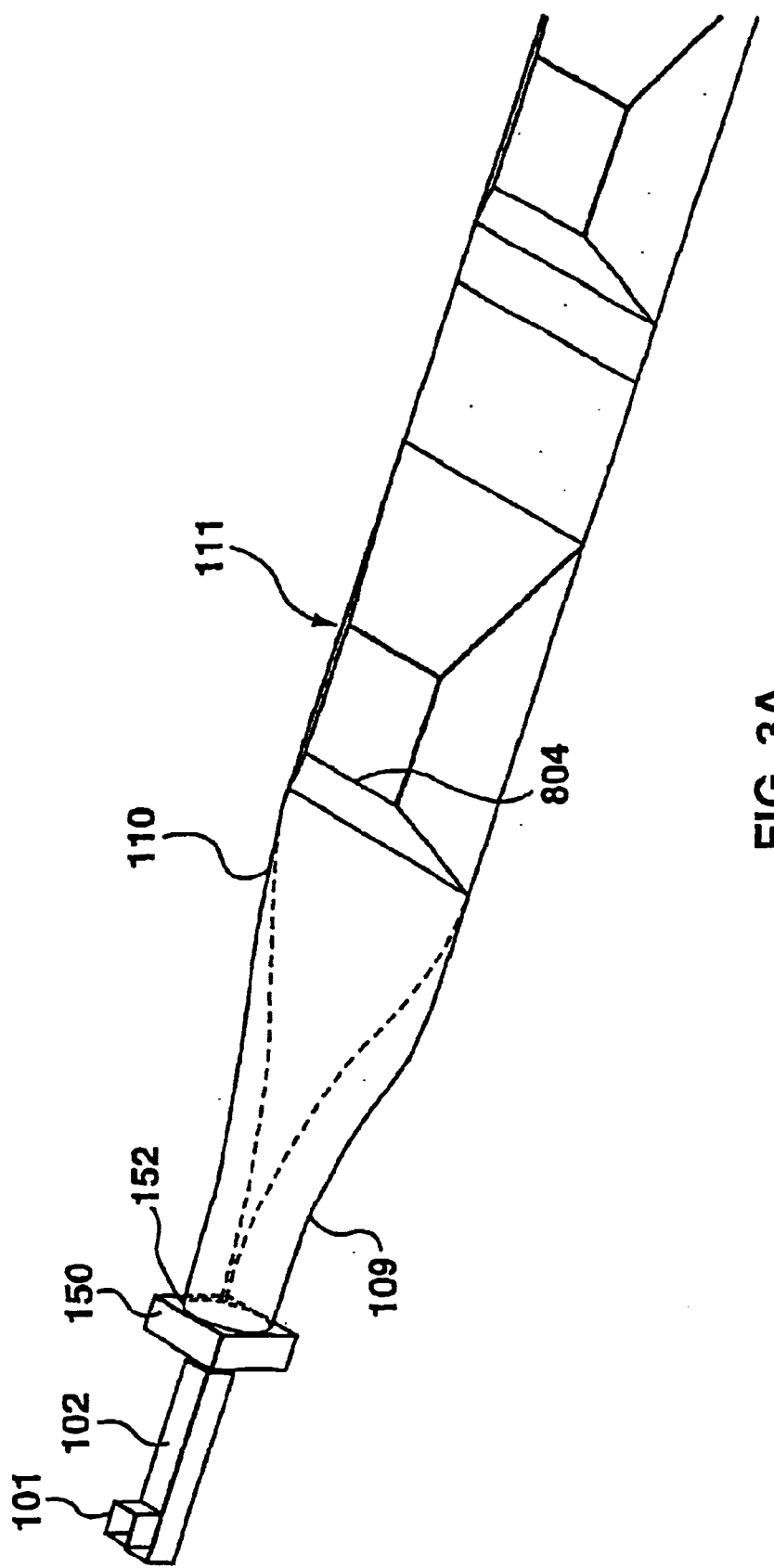
FIG. 3A is a perspective view from above of an annular die extruding pool liners taken from a view above the annular die.

However the invention described herein is directed at producing an article having a three-dimensional continuous surface such as for example as shown in FIGS. 2, 3A and B.

Figure 3B:
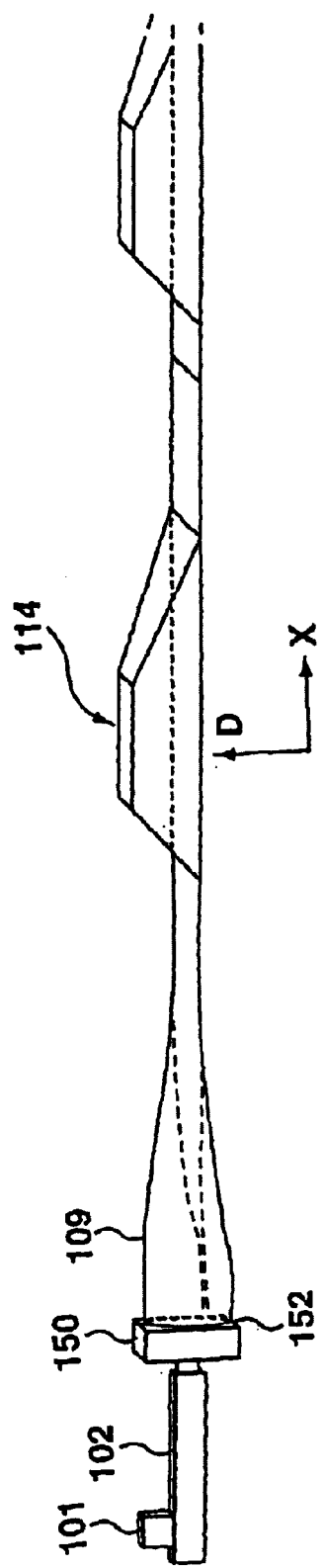
FIG. 3B is a perspective side view of the annual die shown in FIG. 3A.

In particular by way of example FIG. 1 shows the production of yacht sails 112 while FIGS. 3A and B shows production of pool bottom liners 114. Accordingly the pool liner 114 as shown in FIG. 3B can be produced from the annular die 150 whereby the depth D as shown in FIG. 3B can be imparted by increasing the velocity of the extrudate 10 in the desired portions or segments 60 such that the extrudate 10 would flow out at a faster rate as compared to other portions or segments 60. For example a depth of a pool liner for the bottom portion 80a shown in FIG. 3A could be produced in the annular die 150 by having those segments 60 between positions $60a_1$ and $60a_n$ flow out at a faster rate when compared with the other segment 60 as shown in FIG. 6a. This will cause the velocity of the extrudate 10 to flow at a faster rate between the die lips 11 and 113 for each of the segments 60 between $60a_1$ and $60a_n$. By looking at FIG. 6a this would cause the membrane or film extruded from the annular die 150 to flow out of the page in direction X with an imparted curve having a vector tending to flow towards the center of the extruder die 150 along the width of the die lips as well or the extrudate between segments $60a_1$ and $60a_n$. Thereafter after the blown film is removed and slit at an appropriate position along slit 170 one would produce a pool liner 114 having a continuous shaped three-dimensional surface as shown in FIG. 3a. Moreover the sail shown in FIGS. 1a, b and c can also be produced in the annular die as shown in FIG. 6a.

Furthermore the extrusion die 2 having a scrolled slit 170 may be utilized to produce the sail 112 as shown in FIGS. 1a, b and c and 2.

Figure 1B:
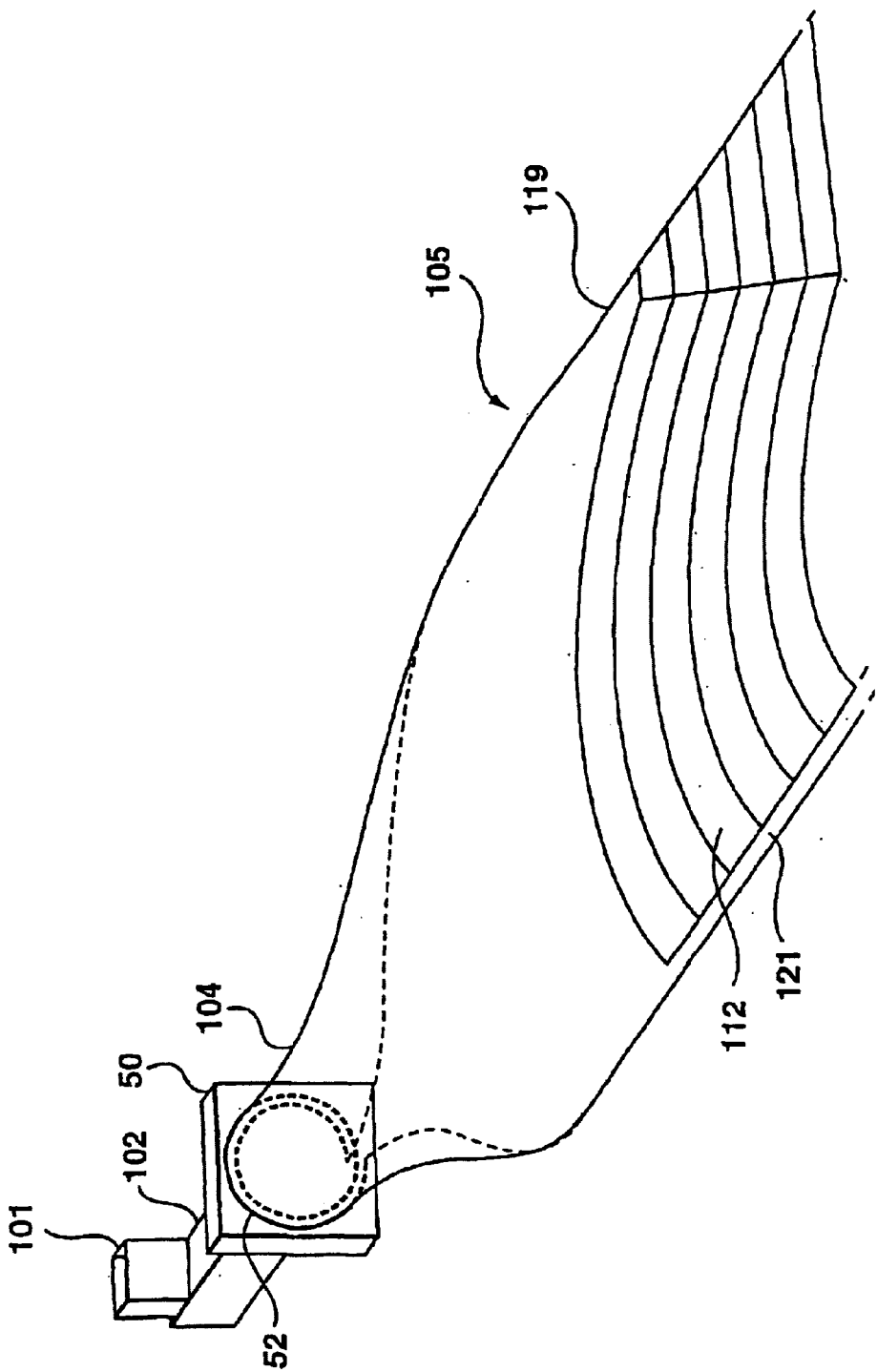
FIG. 1B is a further close-up perspective view of the scroll die of FIG. 1A.

As can be seen from FIG. 1b, one side 119 of the sail 112 has its extremity at one end 64 of the scrolled design as shown in FIG. 5a, while the other side 121 of the sail 112 has its extremity at 62 of the scroll design as shown in FIG. 5a. The two extremities may also be trimmed or defined by an adjustable deckle arrangement, one at either end. As the extrudate is blown from the scroll die 150 and unraveled as shown in FIG. 1b, the three-dimensional contour to the sail 112 may be continuously imparted without seams by means of adjusting a control parameter such as the velocity of the extrudate 10 by means of the ejection rate control elements 213 as described above. In other words if the sail 112 was to have an increasing curvature from position 123 along the X axis to position 125 along the X-axis, one would gradually increase the velocity of the various segments 60 so to impart a gradually increasing curvature in the Y direction.

Figure 5B:
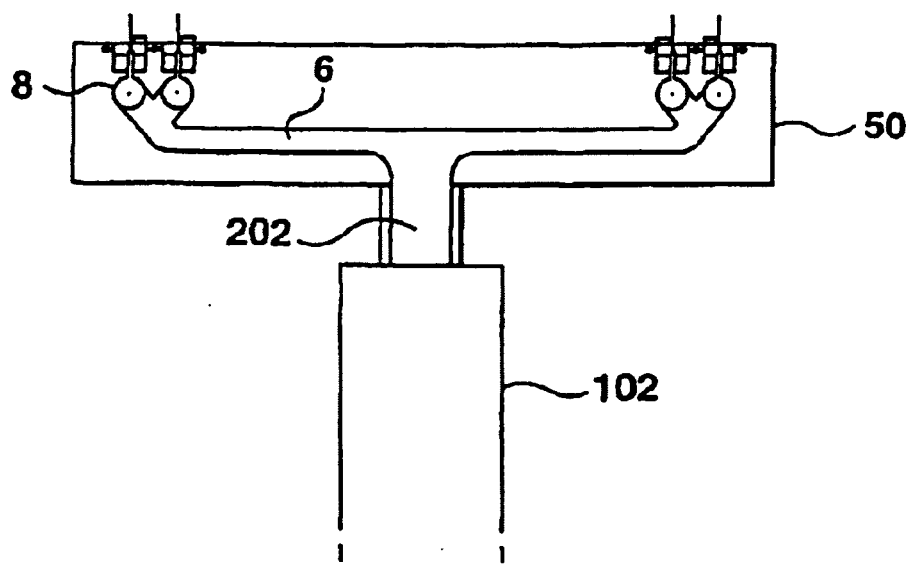
FIG. 5B is a side elevation view of FIG. 5A.
Figure 5C:
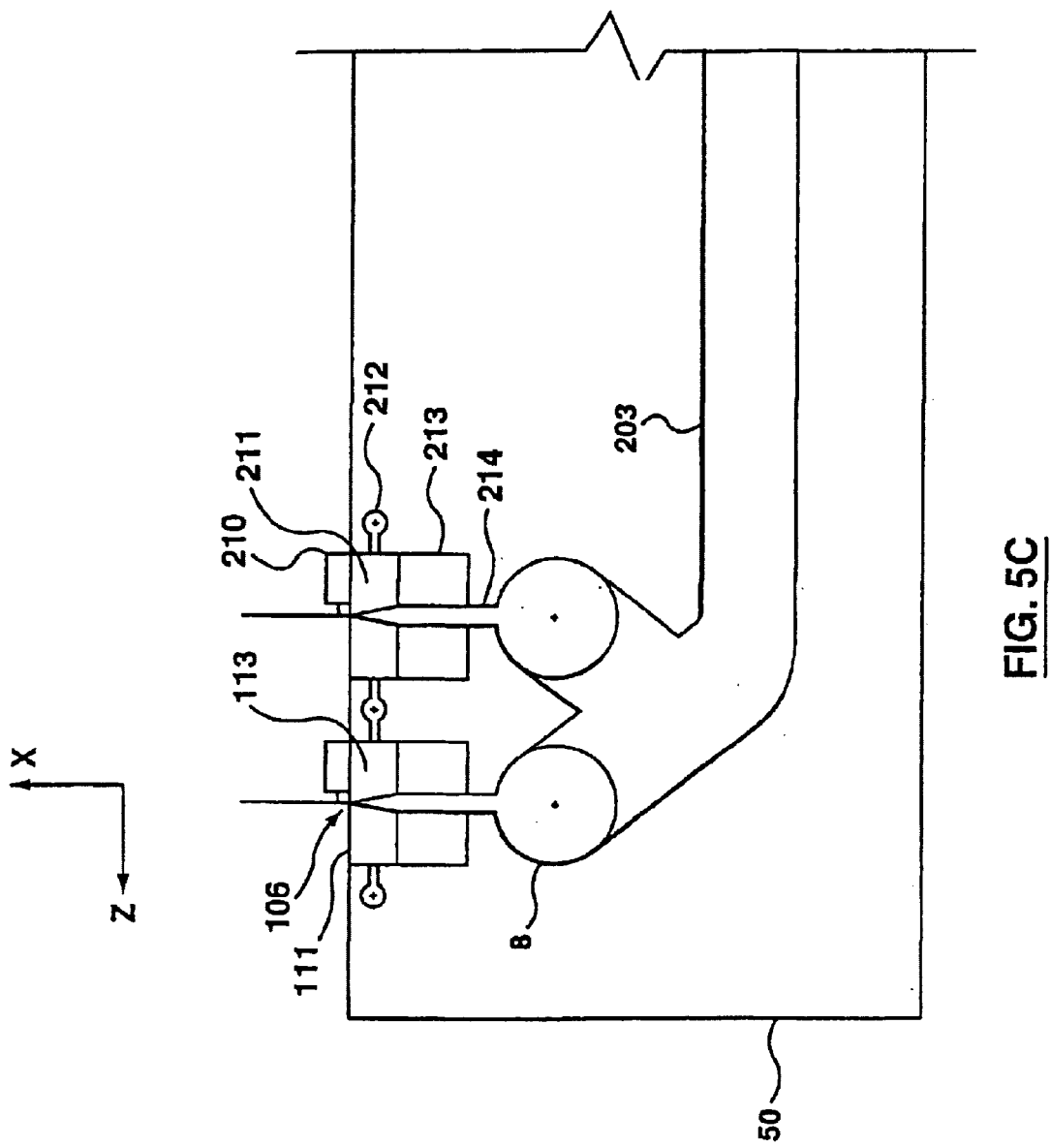
FIG. 5C is a close-up view of FIG. 5B.

For example by viewing FIG. 1a, the scroll die shown as shown as FIG. 5a can be used to impart the curved surface 123a–b by selecting for example each of the positions or segments between 60a and 60b as shown in FIG. 5 and increasing the velocity of the extruded material 10 between the dip lips 111 and 113 of each of the segments in a predetermined calculated fashion so to cause the velocity of the extrudate 10 to exit at a velocity slightly higher than all of the remaining segments 60. This would then impart a curved surface between 123a–b as shown in FIG. 1a. Gradually the velocity of the segments between 60a and 60b could be increased then decreased as the extrudate 10 exits the die as well as the number of segments between 60a and 60c so as to impart the curve illustrated by positions 123a and 123c.

In the case of producing pool liners 114 such pool liners can be produced from PVC material where the extruded membrane is run through a quenching tank 301 with a water line just below the die exit 302. The extrudate can be gently fed around rollers 303 and thereafter gently unscrolled between positions 110 and 111 and loosely wound unto a take-up spoo 1304.

In the case of producing yacht sails 111 a similar apparatus may be utilized having a blown film take-up and winder utilizing air cooling or the like.

Accordingly the apparatus as described above can be utilized to produce extruded articles having seamless complex shapes.

The process involves extruding flowable material 10 in a flowable state through a slot die where the slot die exit has a plane curve along at least a part of its length in the direction Y. The plane of this curve is normal or at 90° to the direction X, being the direction of the material flow from the extruder die.

The invention described herein contemplates utilizing a die slot, which is straight for a portion and curved for another portion thereof. The complex curvature of the extruded die will be formed in the region of the die slot which is curved.

The process also includes measuring a parameter or characteristic of the extrudate in the machine direction X at a plurality of measurement stations 60 across the exit of the die lips 111 and 113. The measurement means could include by way of example the following:

(a) an optical displacement transducer. One means utilizes an optical sensor or camera that measures the velocity of the outer surface layer of the extrudate on one or more sides of the membrane or sheet. In another example laser speed transducers manufactured by TSI may be utilized.

(b) Furthermore the extrudate may include an entrained fiber. For example a strand of carbon fiber may be entrained in the flow of the extrudate and its length measured as it is pulled along with the extrudate in to the direction X. The passage and velocity of entrained magnetic, electrically or optically detected particles may be used to measure the local velocity of the extruded film.

(c) Moreover a surface contact may be utilized using an encoder wheel with a counter.

Thereafter the plurality of measured characteristics or parameters such as for example velocity measurements may be inputted into the computer which simultaneously compares each measured velocity along the plurality of segments or portions 60 with a precalculated or target parameter such as velocity at each measurement station 60 so as to produce an error value. If the measured parameter such as velocity equals the desired or precalculated velocity the error signal will be zero. If the measured velocity at a segment 60 is too low a negative error signal will be produced whereas if a measured velocity is higher than a preselected precalculated velocity a positive error value will be produced.

This error signal will then be fed back to the velocity control means to effect a change to the velocity at the measured position 60 in the manner described above. If the error signal is negative the velocity of the extrudate will be increased of that segment or portion 60. If the error signal is positive the velocity must be decreased. If the error signal is zero, no change occurs.

The velocity at each measured segment 60 will generally be different from other measurement stations 60 so as to produce an extruded membrane of solidified material such as polymeric material with a programmed quantity of complex curvature.

It should be noted that the extrudate 10 must be at least partially solidified at the exit of the die lips 111 and 113 to prevent any deformation after the exit from the die.

This partial or complete solidification could be accomplished by a combination of any of the following:

(a) cooled or lubricated die exits to solidify the walls of the extrudate;

(b) nanostructurally self-assembled polymers formed near the die gap are formed and solidified prior to ejection;

(c) the extrudate could be ejected into a bath or quench tank 301 containing water or other suitable fluid;

(d) if the extrudate 10 was imparted with a thermal set substance, solidification could be accomplished by die heat or heat induced electromagnetic radiation or RF radiation acting on the extrudate or other susceptible particles mixed within the extrudate.;

(e) ionizing radiation has been shown to induce cross-linking in polyethylene which could increase the viscosity and partially solidify the extrudate;

(f) solvent evaporation of Lyotropic Liquid Crystal Polymers such as PBO and Kevlar (trademark of Dupont USA). The evaporation of solvent $H_2SO_4$ while shearing between the walls of a counter-rotating die yields a solidified film of highly oriented anisotropic material suitable for example sails;

(g) by way of example substantially strong polyethylene a process of interfacial surface growth has produced sheets. This process produces a sheet or film of oriented polyethylene from a bath of liquid polymer precursor at relatively low temperatures such as for example 110° C. Solidification or crystallization is effected by the relative sharing between two adjacent surfaces;

(h) surface growth or interfacial solidification may also be produced by counter rotating annular die as used in the blown film industry. This method of polymerization has been demonstrated in the use of ultra high molecular weight polyethylene (UHMW PE);

(i) full polymerization could be effected by the exposure of the extrudate to UV radiation just prior to the exit of the die;

(j) a blow film apparatus may be added just past the die exit, where the extrudate is cooled to freeze the film immediately upon exiting the die. The blow-up ration or BUR could by way of example be 1.0;

(k) The film may optionally be given a speckled colour or a pattern produced by the random or selective addition of particles of different colour into the extruder film of copper, the die manifold or co-extruded near the die lip exit.

The apparatus and process described herein also includes the screw extruder 102 with a feed stock hopper 101, for thermal formable polymeric material. A pump may be used for materials that undergo a chemical reaction upon solidification.

The method and apparatus described herein can be utilized to produce:

(a) an article of manufacture such as by way of example a swimming pool liner of continuous, seamless membrane floor made of plasticized PVC, and optionally a coloured pattern.

(b) An article of manufacture such as a sail comprising a continuous, seamless membrane of highly orientated ultra strong polyethylene extruded from the solution grown process or sections thereof to be joined to make a sail.

(c) An article of manufacture such as a sail comprising a continuous, seamless membrane of highly orientated aromatic polyamide extruded from the solution gel in LCP state. The LCP state comprises a liquid crystal polymer such as Kevlar (trademark) by way of example.

(d) Continuous flowable material may be extruded as well as such materials that include entrained particles of fiber known as chop-strand or continuous fibers.

(e) Further examples of manufacture than can be produced by the process described herein include large portions of tension structures, flexible ducting including elbows, as well as inflatable advertising, awnings, automotive upholstery, curved projection screens, utility or special purpose apparel, tank liners, inflatable structures, parachutes, hull/fuselage wrappers for shipping, packaging for products and food, hot air and research balloons and closed tubular bodies; and any of the above in their entirety or part/sections thereof.

Comparison of Producing Swimming Pool Vinyl

The following is an example of a comparison between manufacturing swimming pool vinyl liners in accordance with the prior art verses producing swimming pool vinyl liners in accordance with the invention described herein.

Swimming pool liners are generally thin elastic membranes made of plasticized PVC. The membrane thickness is usually constant throughout the liner and is usually anywhere from 0.010 up to 0.04 inches thick. The surface may have a uniform colour or may have a predescribed random pattern or a "print" pattern comprising up to four colours (CMYK) on top of the base colour.

Plasticized PVC is supplied in the roll form normally 72 inches wide, each roll weighing between 500 and 1000 pounds.

The majority of a pool liner is the floor. The floor for an average inground pool liner measures about 16 feet by 32 feet and extends from a four foot deep section in the shallow end to an eight feet deep section in the deep end. Production of liner floors uses about 150 pounds of vinyl.

The time to manufacture this liner floor by means of cutting and joining several panels may take two persons from 25 to 60 minutes.

In the process described above the liner floor would be extruded and shaped in one process as a continuous, seamless floor. A single screw extruder would be joined to a die block of a design described above. A three to four inch single screw extruder could process between 600 and 1000 pounds per hour of plasticized PVC. This by way of example gives a production rate of 10–15 minutes for an inground liner which is seamless.

Accordingly the method described hereof provides the following improvements and process:

(a) two to four times production rate increase;

(b) three to five times material cost decrease;

(c) substantial reduction of rolled goods inventory and storage space;

(d) substantial reduction or elimination of the primary causes of failures, i.e. seams;

(e) superior shape more closely matching the pool profile;

(f) reduction in liner design time with no seam calculations required;

(g) controlled thickness.

Although the preferred embodiment as well as the operation and use have been specifically described in relation to the drawings, it should be understood that variations in the preferred embodiment could be achieved by a person skilled in the trade without departing from the spirit of the invention as claimed herein

I claim:

1. A method of producing an extruded membrane of solidified flowable material having a desired curvature comprising:

(a) extruding flowable material through a die slot having a curved section;

(b) measuring a characteristic of the ejection rate of said extruded material at a plurality of positions along said die slot;

(c) comparing said plurality of measurements against a desired plurality of measurements respectively at each said position along said die slot and generating a plurality of signals respectively in response thereto;

(d) effecting a change in said measured characteristic of said extruded material at said positions along said die slot in response to said signals so as to produce said extruded material having a desired curvature.

2. A method as claimed in claim 1 wherein said measured characteristic comprises the velocity of said extruded material at a plurality of positions along said die slot.

3. A method as claimed in claim 2 including cooling said extruded material in a water bath.

4. A method as claimed in claim 3 including winding said cooled extruded material after cooling.

5. A method as claimed in claim 4 wherein said extruding step comprises extruding flowable material through an annular die slot.

6. A method a claimed in claim 4 wherein said extruding step comprises extruding said flowable material through a scrolled die slot.

7. A method of producing an extruded membrane of solidified flowable material having a desired curvature comprising:

(a) extruding flowable material through a die slot having a curved section;

(b) measuring the velocity of said extruded material at a plurality of positions along said die slot.

(c) comparing said plurality of velocity measurements against a desired plurality of target velocity measurements to produce an error signal;

(d) changing the velocity of the flowable materal at each said plurality of positions in response to said error signal so as to produce an extruded membrane having a desired cuvature.

8. A method as claimed in claim 7 wherein said extruded flexible material is extruded through said die in an X direction.

9. A method as claimed in claim 8 wherein said die has a curved section in a Y direction.

10. A method as claimed in claim 9 wherein said extruding step comprises extruding said flowable material through an annular die slot.

11. A method as claimed in claim 9 wherein said extruding step comprises extruding said flowable material through a scrolled die slot.

* * * * *